United States Patent
Suga et al.

(10) Patent No.: US 7,539,886 B2
(45) Date of Patent: May 26, 2009

(54) IMAGE PROCESSING APPARATUS, POWER SAVING CONTROL METHOD, AND PROGRAM AND STORAGE MEDIUM THEREOF

(75) Inventors: Daisuke Suga, Kawasaki (JP); Shunichi Fujise, Abiko (JP); Takehiro Yoshida, Tokyo (JP); Junji Iguchi, Yokohama (JP); Hideya Tabeta, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 302 days.

(21) Appl. No.: 10/592,698

(22) PCT Filed: Mar. 25, 2005

(86) PCT No.: PCT/JP2005/006445

§ 371 (c)(1), (2), (4) Date: Sep. 13, 2006

(87) PCT Pub. No.: WO2005/094055

PCT Pub. Date: Oct. 6, 2005

(65) Prior Publication Data

US 2008/0229132 A1 Sep. 18, 2008

(30) Foreign Application Priority Data

Mar. 26, 2004 (JP) ............................. 2004-092572

(51) Int. Cl.
*G06F 1/32* (2006.01)
(52) U.S. Cl. ...................... 713/324; 713/300; 713/340
(58) Field of Classification Search .......... 713/300–340
See application file for complete search history.

(56) References Cited

U.S. PATENT DOCUMENTS

| 4,717,967 | A | | 1/1988 | Yoshida |
| 5,536,093 | A | | 7/1996 | Tomoda et al. |
| 5,629,694 | A | * | 5/1997 | Simon et al. .................. 341/22 |
| 5,689,289 | A | | 11/1997 | Watanabe et al. |
| 5,721,581 | A | | 2/1998 | Saito et al. |
| 6,561,606 | B1 | | 5/2003 | Yoshida |
| 6,663,209 | B2 | | 12/2003 | Yoshida |
| 6,996,727 | B1 | * | 2/2006 | Snyder et al. ............... 713/300 |
| 2005/0174710 | A1 | | 8/2005 | Masui et al. |
| 2006/0100724 | A1 | * | 5/2006 | Miura et al. .................. 700/82 |

FOREIGN PATENT DOCUMENTS

| JP | 2002-099361 | 4/2002 |
| JP | 2002-108518 | 4/2002 |
| JP | 2003-118204 | 4/2003 |
| JP | 2003-280771 | 10/2003 |

* cited by examiner

*Primary Examiner*—Dennis M Butler
(74) *Attorney, Agent, or Firm*—Fitzpatrick, Cella, Harper & Scinto

(57) ABSTRACT

An object is to provide an image processing apparatus which can reduce power consumption during the power saving standby mode. The starting factor monitor unit and the power saving standby mode voltage control unit are driven with the USB bus power can be supplied during a shift to the power saving standby mode and the starting factor monitor unit and the power saving standby mode voltage control unit are driven by voltage from the main power supply when the USB bus power cannot be supplied during a shift to the power saving standby mode.

13 Claims, 7 Drawing Sheets

| FIG. 1A | FIG. 1B |

IMAGE PROCESSING APPARATUS, POWER SAVING CONTROL METHOD, AND PROGRAM AND STORAGE MEDIUM THEREOF

TECHNICAL FIELD

The present invention relates to an image processing apparatus, a storage medium, and a program. Particularly the invention relates to the image processing apparatus, a power saving control method, the storage medium, and the program which are suitable for power saving control in the image processing apparatuses such as a copying machine, a multi function peripheral, and a facsimile.

BACKGROUND ART

Recently, greater importance is placed on environmental issues, and reduction of power consumption is demanded while information equipment is in the standby state in offices and homes. In order to reduce the power consumption during the standby state in the image processing apparatus such as an MFP (Multi Function Printer), the image processing apparatus is changed to a power saving standby mode to reduce the power consumption while being in the standby state, and the image processing apparatus returns to a normal operation mode when the image processing apparatus is used. Therefore, the power consumption is reduced as a whole.

In the conventional image processing apparatus, there is the well known apparatus, in which a power control unit for turning on a main power supply by connecting a USB interface cable connected to a personal computer in an energized state to a connector provided in a printing apparatus and, when a printing process is not performed for a predetermined time, the power control unit turns off the main power supply to shift to a reception standby state of a printer language by electric power supplied from the personal computer (Japanese Patent Application Laid-Open (JP-A) No. 2003-118204).

In the above conventional example, the main power supply is turned on to perform the printing at the time when the printer language is received. Therefore, the power consumption is reduced.

However, there is a problem that the shift to the power saving standby made is not assumed when the conventional image processing apparatus is used as the MFP, while there is no problem when the conventional image processing apparatus is used as SGP (Single Function Printer.

In the above conventional example, when a PC (Personal Computer) power supply is turned off, when a PC interrupts USB bus power, or when the USB (Universal Serial Bus) cable is unplugged, the main power supply is turned off, which results in the problem that startup cannot be performed by starting factors except for USB.

DISCLOSURE OF THE INVENTION

An object of the invention is to provide an image processing apparatus which can reduce the power consumption during the power saving standby mode in the whole system including the PC and the MFP to lengthen a life of an MFP power supply, and a control method, a program, and a storage medium of the image processing apparatus.

Another object of the invention is provide an image processing apparatus which can interrupt the voltage to a circuit having the function, which is not used during the power saving standby state, to further reduce the power consumption, and a control method, a program, and a storage medium of the image processing apparatus.

BEST MODE FOR CARRYING OUT THE INVENTION

The best mode for carrying out the invention is the following embodiments.

First Embodiment

Figures 1, 1A:
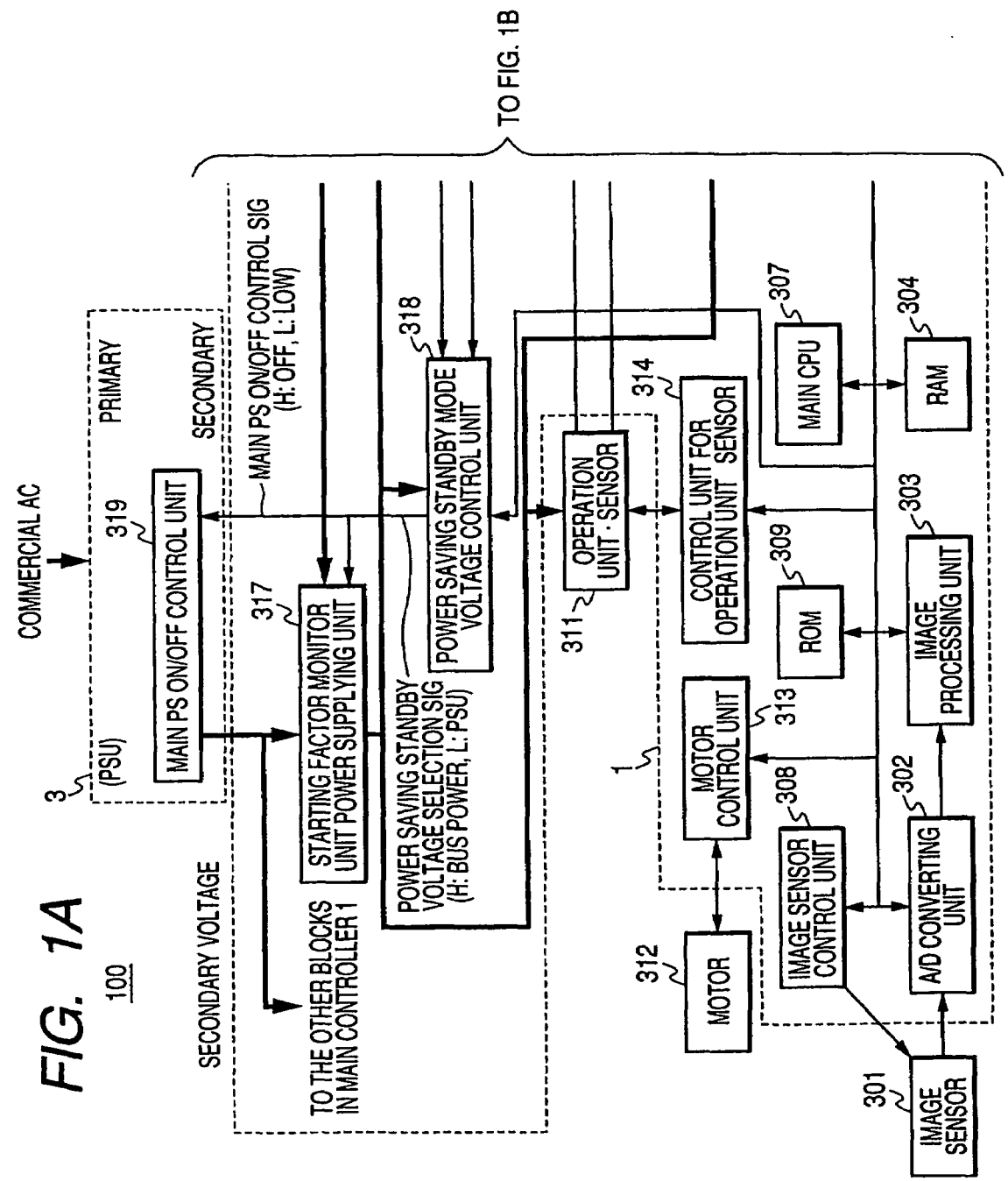
FIGS. 1A and 1B combined as indicated in FIG. 1 are block diagrams showing a configuration of a main portion of an image processing apparatus 100 of a first embodiment of the invention.
Figure 1B:
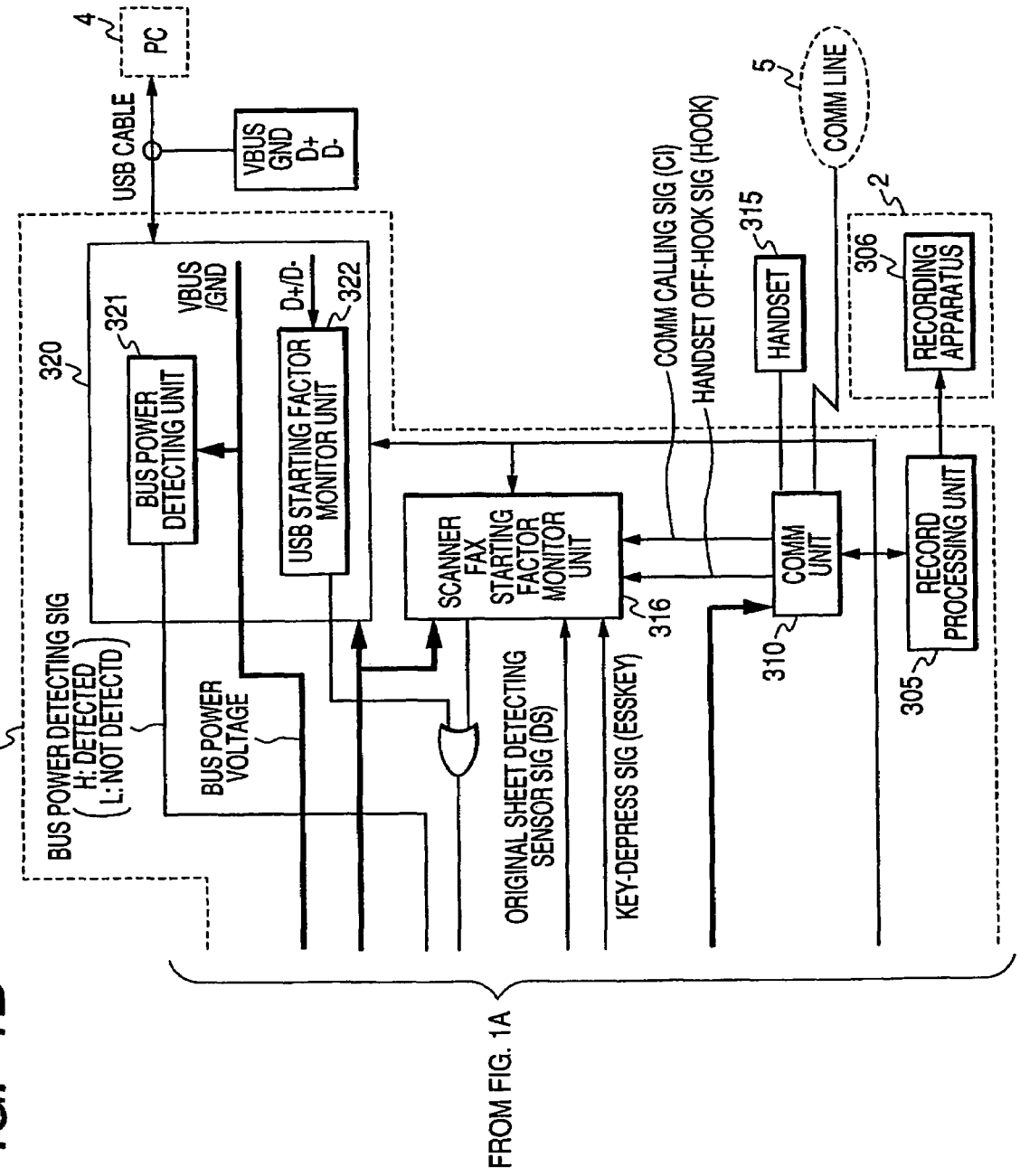

FIGS. 1A and 1B are block diagrams showing a configuration of a main portion of an image processing apparatus 100 of a first embodiment of the invention. In FIGS. 1A and 1B, voltage supply is indicated by thick lines and signal is indicated by thin lines.

An image processing apparatus 100 is one which has image reading function, image forming function, and facsimile function. The image processing apparatus 100 includes an image sensor 301, an A/D converting unit 302, an image processing unit 303, a RAM 304, a record processing unit 305, a recording apparatus 306, a main CPU 307, an image sensor control unit 308, a ROM 309, a communication unit 310, an operation unit and sensor 311, a motor 312, a motor control unit 313, a control unit for operation unit and sensor 314, a handset 315, a scanner and FAX starting factor monitor unit 316, a starting factor monitor unit power supplying unit 317, a power saving standby mode voltage control unit 318, a main power supply on/off control unit 319, a USB I/F 320, a USB bus power detecting unit 321, and a USB starting factor monitor unit 322.

A manuscript (or original document) is irradiated with the light emitted from a light source. The image sensor 301 performs optoelectric conversion of reflected light into an electric signal. The A/D converting unit 302 performs A/D conversion of an output signal of the image sensor 301. The image processing unit 303 performs image processing to the output signal of the A/D converting unit 302. The image processing unit 303 includes a computing unit for shading correction, a code/decode processing unit, a memory for storing image data, a luminance/density conversion table, light source lighting time measuring block, and the like.

The image data to which the image processing unit 303 performs the image processing is stored in the RAM 304. The record processing unit 305 performs recording (image forming) image processing. The recording apparatus 306 records (forms) the image in recording paper. The main CPU 307 is a central processing unit which controls each unit of the image processing apparatus. The main CPU 307 performs a process of a timing chart shown in FIG. 2 based on a control program stored in the ROM 309 or a control program provided from an external device. The image sensor control unit 308 controls the image sensor 301 for reading the manuscript based on a light source control signal, a storage control signal, and a sensor control signal.

Various control programs including a power saving control program of the invention and various pieces of fixed data are stored in the ROM 309. The communication unit 310 controls data communication between the image processing apparatus and the external devices. In the case where the image processing apparatus has the facsimile function, the communication unit 310 includes NCU (Network Control Unit) and a modem. In the case where the image processing apparatus has a network connection function, the communication unit 310 includes NIC (network Interface Card).

The motor 312 drives a carriage to which the image sensor 301 is fixed. The motor control unit 313 controls the drive of the motor 312. The control unit for operation unit and sensor 314 controls input and output on the signal to the operation unit and sensor 311. An operation portion in the operation unit and sensor 311 includes input means for performing the input of various pieces of data and various settings and display means for performing various displays.

The above configuration will be described in detail. Electric power is supplied from a main power supply (main power source or power supply unit) 3 to each of the blocks (image sensor 301 to handset 315) of the image processing apparatus 100. The blocks of the image processing unit 100 are connected to one another through electric signal lines, and the data can be transmitted among the blocks. Therefore, the main CPU 307 reads the program from the ROM 309 to execute the program, which allows the blocks to be are controlled.

When the image processing apparatus 100 is in action after the power is turned on to perform initial action, a user operates the operation portion of the image processing apparatus 100 to use copying function or the facsimile function which are owned by the image processing apparatus 100, which allows the user to provide directions of setting modes of various actions in the image processing apparatus 100. In the case where the image processing apparatus 100 is connected to a PC 4 through a USB I/F 320, or in the case where the image processing apparatus 100 is connected to the network (communication line 5) through the communication unit 310, the image processing apparatus 100 is operated as a PC printer by receiving print data from the PC.

Further, the image processing apparatus 100 can perform the receiving action of the facsimile to conduct the communication using the handset 315 by connecting the image processing apparatus 100 to PSTN (Public Switched Telephone Network) (communication line 5) through the communication unit 310.

Then, the action of the image processing apparatus of the first embodiment of the invention will be described.

Figure 2:
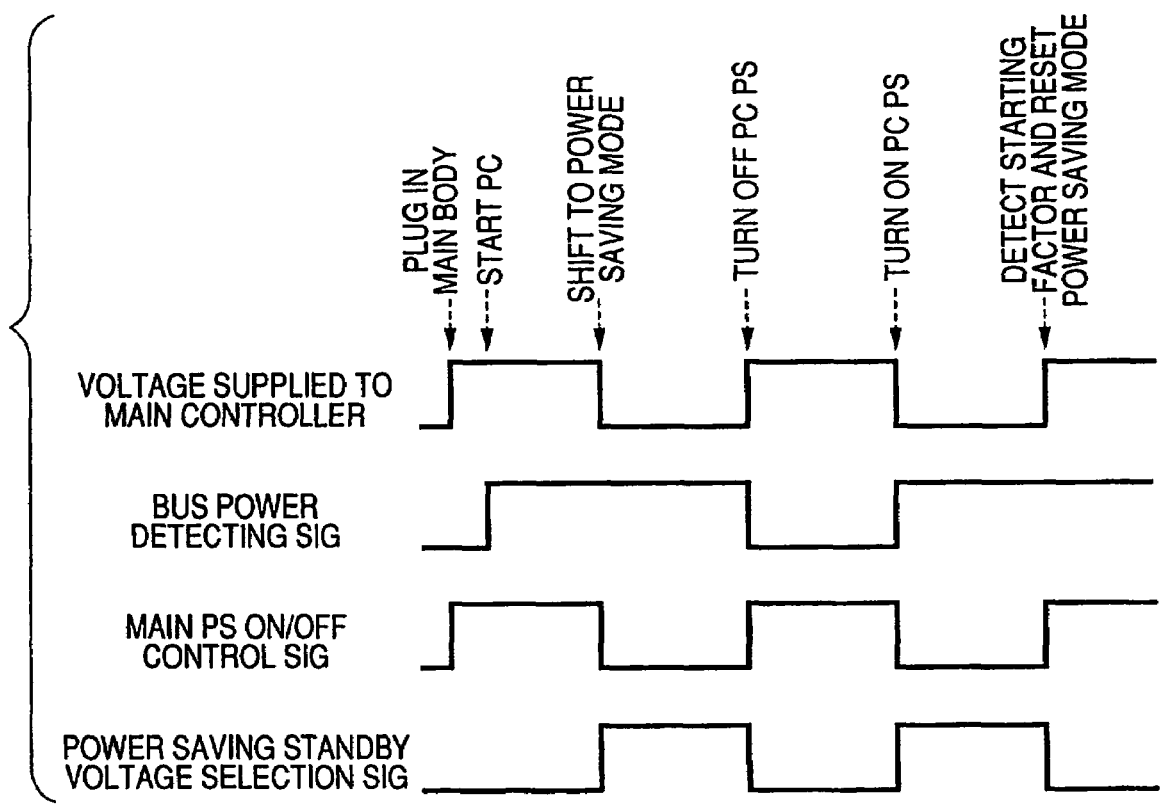
FIG. 2 is a timing chart showing a relationship between a voltage supply state and each of voltage supply control signals in the first embodiment.

FIG. 2 is a timing chart showing a relationship between a voltage supply state and each of voltage supply control signals in the first embodiment.

Figure 3:
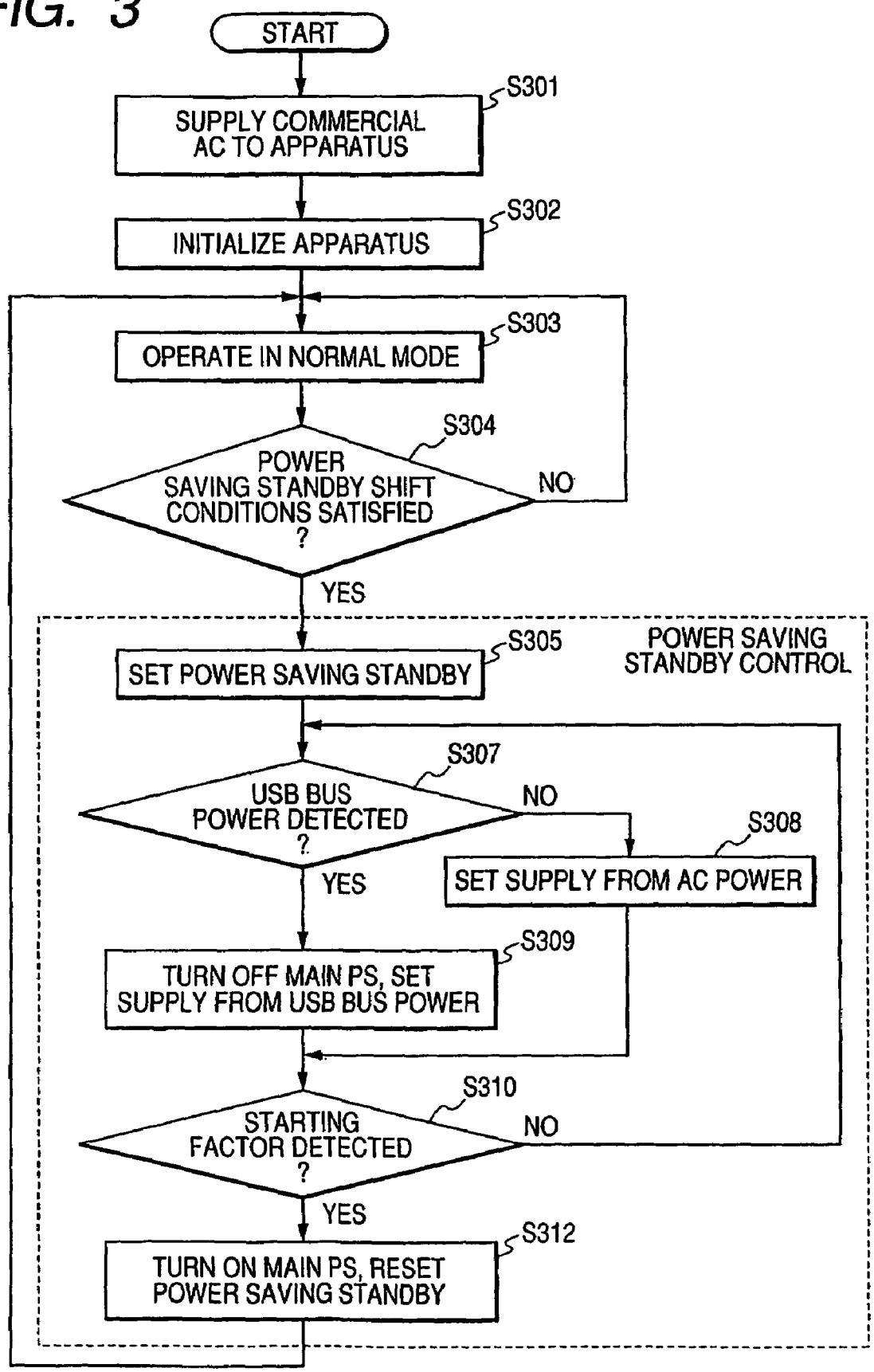
FIG. 3 is a flowchart showing an action which is executed by a main CPU 307 based on a program and then executed by a power saving standby mode voltage control unit 318 based on the program or a built-in logic circuit in the image processing apparatus of the first embodiment.

FIG. 3 is a flowchart showing the action which is executed by the main CPU 307 based on the program and then executed by the power saving standby mode voltage control unit 318 based on the program or a built-in logic circuit in the image processing apparatus of the first embodiment.

It is assumed that a USB cable is unplugged, an electric cord of the image processing apparatus is removed, and commercial alternating-current power supply (hereinafter referred to as "commercial AC") is not provided.

The electric cord of the image processing apparatus 100 is plugged, and the commercial AC is input to the image processing apparatus (S301). The main power supply on/off control unit 319 in the image processing apparatus 100 turns the main power supply on or off according to a main power supply on/off control signal from the power saving standby mode voltage control unit 318.

When the main power supply on/off control signal is H (High), the main power supply is turned off. When the main power supply on/off control signal is L (Low), the main power supply is turned on. Since the main power supply on/off control signal is L, the voltage generated by the commercial AC is supplied to a main controller 1 from the main power supply 3.

The voltage is supplied to other loads (the motor 312, the operation unit and sensor 311, the image sensor 301, the recording apparatus 306, and the handset 315 in FIG. 1B) and the starting factor monitor unit power supplying unit 317 inside the image processing apparatus through the main controller 1.

For example, voltages of +5V and +3.3V are supplied to the starting factor monitor unit power supplying unit 317, voltages of +24V, +12V, +5V, and +3.3V are supplied to other loads in the main controller 1 and the image processing apparatus 100, and alternating current for heater is supplied.

Therefore, a reset circuit (not shown) in the main controller 1 resets the main controller 1, and the main CPU 307 reads the program from the ROM 309 after the reset is cancelled.

Then, the main CPU 307 initializes all pieces of hardware in the image processing apparatus 100. Therefore, the scanner and FAX starting factor monitor unit 316, the starting factor monitor unit power supplying unit 317, the power saving standby mode voltage control unit 318, the USB I/F 320, and the USB bus power detecting unit 321 and the USB starting factor monitor unit 322 which are located in the USB I/F 320 are initialized. At this point, since the image processing apparatus 100 is operated in the normal operating mode, the main power supply on/off control signal is initialized in L, and a power saving standby mode voltage control signal is initialized in L (S302).

After the initialization, the image processing apparatus 100 is operated in the normal operating mode. All the functions as the MFP can be used as long as the image processing apparatus 100 is operated in the normal operating mode. For example, the copying function, the facsimile function, the speaking function with a telephone, the PC printer function, the scanner function, and the e-mail function can be used.

It is assumed that the USB cable is plugged in the PC 4 and the image processing apparatus 100, which are startup and running, in order to be able to perform the printing. At this point, because VBUS and GND of the USB cable are input to the USB bus power detecting unit 321 and detected, a bus power detecting signal becomes H. Because a D+ signal and a D− signal of the USB cable are input to USB the I/F 320 and communication is conducted, a USB starting factor generation signal output from the USB starting factor monitor unit 322 becomes H, and the USB starting factor monitor notifies the power saving standby mode voltage control unit 318 of the generation of a USB starting factor. In this case, since the operating mode is not the power saving standby mode, any special operation is not performed by the USB starting factor (S303).

The main CPU 307 periodically determines whether power saving standby shift conditions are satisfied or not. When the power saving standby shift conditions are not satisfied, the flow goes to Step S303 of the normal operating mode (S304).

The standby state in which the image processing apparatus 100 does not particularly use the function is monitored by a timer. When a setting time elapses, or when the user operates the operation portion to direct the image processing apparatus 100 to shift to the power saving standby mode, the power saving standby shift conditions are satisfied unless the image processing apparatus 100 is in action, and the flow goes to Step S305. When the image processing apparatus 100 is in speaking, FAX communication, printing, scanning, data transmission, or data reception action, the main CPU 307 determines that the image processing apparatus 100 is in action, the flow does not go to the power saving standby mode.

When the flow goes to the power saving standby mode, the main CPU 307 set the power saving standby mode voltage control unit 318 to the power saving standby mode. The USB I/F 320 periodically conducts the communication with the USB of the PC during the power saving standby mode so that the communication of USB does not shift to a suspend mode as necessary. Then, the flow goes to Step S307.

In the power saving standby mode voltage control unit 318, it is possible that the program of a sub CPU is stored in the ROM into which the sub CPU is incorporated. It is possible that the above program is configured by a logic circuit formed by transistors, FETs, and logic ICs. In the above embodiment, the power saving standby mode voltage control unit 318 is formed by the sub CPU (S305).

Step S307 to Step S309 are important points of the invention. The power saving standby mode voltage control unit 318 determines whether USB bus power can be detected or not in or during the shift to the power saving standby. When the USB cable is connected during the startup of the PC, because the current for the USB bus power consumed on the MFP main body side is changed, reconfiguration is performed.

Because the USB bus power can be detected, the USB bus power detecting unit 321 outputs H of a USB bus power detecting signal, and the flow goes to Step S309. When the PC is not in startup, when the USB bus power is interrupted, or when the USB cable is unplugged, since the USB bus power cannot be detected, the USB bus power detecting unit 321 outputs L of the USB bus power detecting signal, and the flow goes to Step S308 (S307).

When the USB bus power cannot be detected, because the main power supply 3 provides the voltage during the power saving standby mode, the power saving standby mode voltage control unit 318 controls the main power supply on/off control signal in L.

Therefore, the main power supply on/off control unit 319 supplies the voltage from the main power supply 3 to the main controller 1. However, the main CPU 307 interrupts the voltage to other loads (the motor 312, a part of the operation unit and sensor 311, the image sensor 301, and the recording apparatus 306 in FIG. 1A) which are not necessary to be operated during the power saving standby mode in the image processing apparatus 100, and a part of the control unit for operation unit and sensor 314, the image sensor 301, the A/D converting unit 302, the image processing unit 303, the recording apparatus 306, the image sensor control unit 308, and the motor control unit 313 are caused to be inactivated.

The power saving standby mode voltage control unit 318 controls the main power supply on/off control signal in L. Therefore, the starting factor monitor unit power supplying unit 317 makes a change so that the voltage generated by the main power supply 3 is provided to the units which are operated during the power saving standby mode.

At this point, a power saving key in the operation portion, a manuscript detecting sensor, a platen open-close sensor, a handset off-hook detecting circuit, a communication call signal detecting circuit, the scanner and FAX starting factor monitor unit 316, the starting factor monitor unit power supplying unit 317, the power saving standby mode voltage control unit 318, the USB I/F 320, the USB bus power detecting unit 321, and the USB starting factor monitor unit 322 can be cited as the units which are operated during the power saving standby mode. Then, the flow goes to Step S310 (S308).

When the USB bus power in Step S307, because the USB bus power provides the voltage during the power saving standby mode, the power saving standby mode voltage control unit 318 controls the main power supply on/off control signal in H.

Therefore, the main power supply on/off control unit 319 turns the main power supply off to interrupt the voltage supply. The power saving standby mode voltage control unit 318 controls the power saving standby voltage selection signal in H, which allows the starting factor monitor unit power supplying unit 317 to make the change so that the voltage generated from the USB bus power is supplied to the units which are operated during the power saving standby mode.

The circuits such as a DC-DC converter which converts +5V of the USB power into 3.3V are incorporated in the starting factor monitor unit power supplying unit 317. Usually efficiency of the main power supply is remarkably decreased during low-power consumption. From a viewpoint of the whole system, driving the image processing apparatus 100 with the USB bus power decreases the number of running power supplies from two to one. Accordingly, since the power consumption loss caused by worsening the power supply efficiency can be reduced, it is effective to energy conservation. Then, the flow goes to Step S310 (S309).

In Step S310, the power saving standby mode voltage control unit 318 determines whether a starting factor detecting signal is output from the scanner and FAX starting factor monitor unit 316 or the USB starting factor monitor unit 322. When the starting factor detecting signal is not output, the flow goes to Step S307.

The reason for the shift to Step S307 will be described. In the power saving standby mode, the USB bus power is not supplied when the PC power is turned off, or the USB bus power is interrupted when the USB cable is unplugged, so that a starting factor cannot be detected.

In the MFP, even if the USB bus power is not supplied, since it is necessary to detect the starting factor, the flow returns to S307. When the flow returns to S307, the flow goes to S308 at the time when the USB bus power cannot be detected, and the power saving standby mode can be continued by the voltage from the commercial AC.

Then Step S310 will be described.

When the starting factor detecting signal is output, in order to return the image processing apparatus to the normal operation mode from the power saving standby mode to make the shift to the normal operation mode, the flow goes to Step S312. At this point, the starting factors include the pressdown of the power saving key in the operation portion, the detection of the manuscript detecting sensor, the detection of the platen open-close sensor, the detection of the handset off-hook, and the detection of print job generation from communication call signal detecting USB.

When the starting factor exists, the USB starting factor monitor unit 322 or the scanner and FAX starting factor monitor unit 316 changes the starting factor detecting signal to H and notifies the power saving standby mode voltage control unit 318 of the change of the starting factor detecting signal (S310).

In Step S312, the image processing apparatus returns to the normal operation mode from the power saving standby mode. The power saving standby mode voltage control unit 318 control the main power supply on/off control signal in L. The main power supply on/off control unit 319 turns on the main power supply to supply the voltage to the min controller 1 from the main power supply 3. The power saving standby mode voltage control unit 318 controls the power saving standby voltage selection signal in L. The starting factor monitor unit power supplying unit 317 makes the change so that the voltage generated from the main power supply 3 is supplied to the unit operated during the power saving standby mode. Since the current consumed as the USB bus power by the MFP main body side is changed, reconfiguration is performed. Then, the flow goes to Step S303 (S312).

The copying case in which the image processing apparatus 100 reads an image of the manuscript to form the image on recording paper after the image processing apparatus 100 is started up by the predetermined starting factor will be described.

The user loads the manuscript on the image processing apparatus 100 to direct the image processing apparatus 100 to make a copy. The carriage to which the image sensor 301 is fixed is the movable type carriage which is coupled to the motor 312 through a gear and a belt. The main CPU 307 conveys the carriage to a white reference board to obtain data for back shading and data for white shading.

In the embodiment, the manuscript is read from a front end to a rear end in a longitudinal direction at density of 600 dpi. A computing unit in the image processing unit 303 stores a 10-bit readout value for the sake of white shading correction and black shading correction. The 10-bit readout value is obtained by the A/D conversion of the output of the image sensor 301 using the A/D conversing unit 302.

After the shading correction data is obtained, the carriage is conveyed to a home position, and then the carriage is conveyed toward the manuscript direction again. When a clock times and a predetermined time elapses, the main CPU 307 determines that the image sensor 301 reaches a front end position of the manuscript, and a reading process is started by the image sensor 301.

The readout value of one line read by the image sensor 301 is normalized by the following equation with the white shading correction value and the black shading correction value of the corresponding same pixel position, and luminance of each pixel is obtained by integrating the number of processed gradations (for example, 8-bit gradation).

Luminance value=255×(readout value−black shading value)/(white shading value−black shading value)

In converting the luminance value obtained by the above computation into a density value, the obtained luminance value is converted into the corresponding density value referring to the luminance density conversion table (not shown).

Then, a multi-value binarizing process is performed to the density value. There are various multi-value binarizing methods including an error diffusion method. In the error diffusion method, a center value of the gradation (127 levels in the case of 256 gradation levels) is set to a threshold value for the density value of the focused pixel. When the density value is more than the threshold value, it is determined that the focused pixel is black. When the density value is not more than the threshold, it is determined that the focused pixel is white.

At this point, a difference between the density value of the focused pixel and the density value of black (gradation of 255 levels) or white (gradation of 0 level) is set to an error, and the binarizing process is performed while the error is equally divided into adjacent pixels. The obtained binary image data is used as communication image data transmitted from the image processing apparatus 100 to the external apparatus or recording (image forming) process image data in the image processing apparatus 100.

In the embodiment, the image data of A3-size one page is stored in the RAM 304. That is, the 600-by-600-dpi image data processed by the image processing unit 303 is stored in the RAM 304. In storing the image data in the RAM 304, and in transferring the image data from the RAM 304 to the record processing unit 305, it is possible that the image data is compressed and expanded by a proper compression/expansion method. The image data is transferred from the RAM 304 to the record processing unit 305, the record processing unit 305 performs the recording image processing, and the recording apparatus 306 records the image in the recording paper. The record processing unit 305 converts the 600-by-600-dpi image data into the 1200-by-1200-dpi image data to perform a smoothing process.

In the case where the recording apparatus 306 is a laser beam printer, a laser beam of a laser generating device in the laser beam printer is turned on and off according to the image data transmitted from the record processing unit 305. A polygon mirror in the laser beam printer is controlled so as to rotate at constant velocity. The laser beam is reflected by the polygon mirror, and a main direction on a photoconductor drum charged by a charging device is irradiated with the laser beam to neutralize the charge only at a position irradiated with the laser beam, which allows an electrostatic latent image of one main scan line to be formed.

A development device causes toner to adhere to the electrostatic latent image formed on the photoconductor drum, a transfer device transfers the toner onto the recording paper. After a static eliminator separates the recording paper, a fixing device fixes the toner onto the recording paper. After the toner is transferred to the recording paper, a cleaner blade removes the toner remaining on the photoconductor drum. The printing is performed to the recording paper by the above procedures.

Then, the case in which the image processing apparatus 100 conducts the facsimile communication will be described.

In the embodiment, the image data of A3-size one page is stored in the RAM 304. After the image processing unit 303 performs row- and column conversion, in a fine mode, the 600-by-600-dpi image data is converted into resolution of 8 pel×7.7 mm/lines. Then, the image data is transferred to the code decoding processing unit in the image processing unit 303, and the image data is coded by MR (Modified Read) (k=8). The coded image data is stored in the RAM 304.

The main CPU 307 controls NCU (Network Control Unit) in the communication unit 310 to try to connect the image processing apparatus 100 to the other end of the facsimile having the specified telephone number by placing a call to the other end through a public telephone network. When the image processing apparatus 100 is connected to the other end of the facsimile having the specified telephone number, the proper facsimile communication is performed according to the procedure of T.30 Recommendation of ITU (International Telecommunication Union)-T (Telecommunication Standardization Sector).

At this point, after the image data is transferred from the RAM 304 to the code decoding processing unit in the image processing unit 303, the image data is converted into the raw image data, and the coding is performed according to the other end of the facsimile again to transfer the coded data to a modem in the communication unit 310. The modem modulates the coded data to transmit the image data to the other end of the facsimile through the public telephone network.

As described above, according to the image processing apparatus 100 of the first embodiment of the invention, the image processing apparatus 100 is driven by the USB bus power when the USB bus power can be supplied in or during the shift to the power saving standby mode. Usually power supply efficiency becomes worsened because the small amount of power is consumed in the MFP during the power saving standby mode of MFP, in the whole system including the PC and the MFP. Thus, since one of the power supplies whose power supply efficiency becomes worse is turned off, the power consumption can be reduced during the power saving standby mode and the life of the MFP power supply can be lengthened.

When the USB bus power cannot be supplied, the power supply is automatically changed so that the image processing apparatus 100 is driven by the voltage from the main power supply. Therefore, even if the USB cable is unplugged, even if the USB bus power is interrupted, or even if the PC power supply is turned off, the shift to the power saving standby mode can be made, however, the reduction amount of power consumption is decreased.

Second Embodiment

An image processing apparatus (not shown) of a second embodiment of the invention is basically similar to the image processing apparatus 100 shown in FIG. 1A. The image processing apparatus of the second embodiment differs from the image processing apparatus 100 only in that the power saving standby mode voltage control unit is driven by the USB bus power when the USB bus power can be supplied in or during the shift to the power saving standby mode, and a part of the starting factor monitor unit is driven according to the settings and another part of the starting factor monitor unit is stopped.

For example, when the FAX function of the MFP is not used, or when the telephone line is unplugged, it is not necessary to detect a communication call signal CI. Because a photo MOS relay and the like are used in the circuit which detects the communication call signal CI, the power consumption of several milliamperes can be reduced unless the communication call signal CI is detected.

Therefore, the user setting or the result of automatically detecting whether the telephone line is connected to a switchboard or PBX is stored in the main CPU 307, the RAM 304, the ROM 309, and the like, and the voltage to the circuit for detecting the communication call signal CI is interrupted during the power saving standby mode according to the settings. The circuit which detects the communication call signal CI is incorporated into the communication unit. The configuration except for the above description is the same as the configuration shown in FIGS. 1A and 1B.

According to the image processing apparatus of the second embodiment of the invention, the image processing apparatus 100 is driven by the USB bus power when the USB bus power can be supplied in or during the shift to the power saving standby mode. Usually power supply efficiency becomes worsened because the small amount of power is consumed in the MFP during the power saving standby mode of MFP, in the whole system including the PC and the MFP. Thus, since one of the power supplies whose power supply efficiency becomes worse is turned off, the power consumption can be reduced during the power saving standby mode and the life of the MFP power supply can be lengthened.

When the USB bus power cannot be supplied, the power supply is automatically changed so that the image processing apparatus of the second embodiment is driven by the voltage from the main power supply. Therefore, even if the USB cable is unplugged, even if the USB bus power is interrupted, or even if the PC power supply is turned off, the shift to the power saving standby mode can be made, however, the reduction amount of power consumption is decreased. The voltage supply to the circuit having the function which is not used is interrupted, so that the power consumption can further be reduced.

Third Embodiment

An image processing apparatus (not shown) of a third embodiment of the invention is basically similar to the image processing apparatus 100 shown in FIGS. 1A and 1B. The image processing apparatus of the third embodiment differs from the image processing apparatus 100 only in that main power supply on/off control unit 319 turns on and off the commercial AC.

According to the image processing apparatus of the third embodiment of the invention, the image processing apparatus 100 is driven by the USB bus power when the USB bus power can be supplied in or during the shift to the power saving standby mode. Usually power supply efficiency becomes worsened because the small amount of power is consumed in the MFP during the power saving standby mode of MFP, in the whole system including the PC and the MFP. Thus, since one of the power supplies whose power supply efficiency becomes worse is turned off, the power consumption can be reduced during the power saving standby mode and the life of the MFP power supply can be lengthened.

When the USB bus power cannot be supplied, the power supply is automatically changed so that the image processing apparatus of the third embodiment is driven by the voltage from the main power supply. Therefore, even if the USB cable is unplugged, even if the USB bus power is interrupted, or even if the PC power supply is turned off, the shift to the power saving standby mode can be made, however, the reduction amount of power consumption is decreased.

Fourth Embodiment

An image processing apparatus (not shown) of a fourth embodiment of the invention is basically similar to the image processing apparatus 100 shown in FIGS. 1A and 1B. The image processing apparatus of the fourth embodiment differs from the image processing apparatus 100 only in that the main power supply on/off control unit 319 turns the battery on and off.

According to the image processing apparatus of the fourth embodiment, the image processing apparatus 100 is driven by the USB bus power when the USB bus power can be supplied in or during the shift to the power saving standby mode.

Usually power supply efficiency becomes worsened because the small amount of power is consumed in the MFP during the power saving standby mode of MFP, in the whole system including the PC and the MFP. Thus, since one of the power supplies whose power supply efficiency becomes worse is turned off, the power consumption can be reduced during the power saving standby mode and the life of the MFP power supply can be lengthened.

Further, according to the fourth embodiment, when the USB bus power cannot be supplied, the power supply is automatically changed so that the image processing apparatus is driven by the voltage from the main power supply. Therefore, even if the USB cable is unplugged, even if the USB bus power is interrupted, or even if the PC power supply is turned off, the shift to the power saving standby mode can be made, however, the reduction amount of power consumption is decreased.

Fifth Embodiment

In a fifth embodiment, the invention is applied to a system formed by the plural apparatuses and the invention is also applied to an apparatus formed by the single device. The media such as the storage medium in which a program code of software for realizing the functions of the above embodiments is stored is provided to the system or the apparatus, and the computer (or CPU or MPU) in the system or the apparatus reads the program code stored in the media such as the storage medium to execute the program. Therefore, the above embodiments are achieved.

The fifth embodiment is an example of a program which causes a computer to execute a main power supply on/off control procedure of turning on or off a main power supply; a starting factor monitor procedure of detecting a return factor from a power saving standby state to a normal operation state during a power saving standby mode; a USB bus power detecting procedure of detecting USB bus power in the USB I/F which can receive power supply; a power saving standby mode voltage control procedure of selecting a starting factor monitor unit or a unit operated during the power saving standby mode as a voltage supplying object; and a shift procedure of causing a power saving standby mode voltage control unit to control supply voltage to a main power supply on/off control unit and supply voltage to a voltage supply portion in the starting factor monitor unit according to a signal from the USB bus power detecting unit, in accordance with a signal from a USB bus detecting unit, so that (1) the starting factor monitor unit and the power saving standby mode voltage control unit are driven with the USB bus power when the USB bus power can be supplied during the shift to the power saving standby mode and (2) the starting factor monitor unit and the power saving standby mode voltage control unit are driven by voltage from the main power supply when the USB bus power cannot be supplied, the shift procedure making the shift to the normal operation state in which the image processing apparatus is driven by the voltage from the main power supply when the starting factor monitor unit detects the return factor from the power saving standby state to the normal operation state during the power saving standby mode.

In this case, the program code read from the media such as the storage medium realizes the functions of the above embodiments by itself, the media such as the storage medium in which the program code is stored constitutes the invention. Examples of the media such as the storage medium for providing the program code include a floppy (registered trademark) disk, a hard disk drive, an optical disk, a magneto-optical disk, a CD-ROM, a CD-R, a magnetic tape, a non-volatile memory card, a ROM, and download through a network.

Not only the functions of the above embodiments are realized by executing the program code which is read with the computer, but also OS and the like which are running on the computer perform a part of or all the actual process based on the direction of the program code to realize the functions of the above embodiments.

Further, after the program code read from the media such as the storage medium is written in the memory included in an expansion board inserted into the computer or an expansion unit connected to the computer, the CPU and the like which are included in the expansion board or the expansion unit perform a part of or all the actual process based on the direction of the program code to realize the functions of the above embodiments.

That is, the above embodiments are an example of an image processing apparatus comprising a main power supply on/off control unit 319 which turns on or off a main power supply; starting factor monitor units 316 and 322 which detect a return factor from a power saving standby state to a normal operation state during a power saving standby mode; a USB bus power detecting unit 321 which detects USB bus power in the USB I/F which can receive power supply; a power saving standby mode voltage control unit 318 which selects the starting factor monitor unit or a unit operated during the power saving standby mode as a voltage supplying object; and shift means for causing the power saving standby mode voltage control unit to control supply voltage to the main power supply on/off control unit and supply voltage to a voltage supply portion in the starting factor monitor unit according to a signal from the USB bus power detecting unit, in accordance with a signal from the USB bus power detecting unit, so that (1) the starting factor monitor unit and the power saving standby mode voltage control unit are driven with the USB bus power when the USB bus power can be supplied during a shift to the power saving standby mode and (2) the starting factor monitor unit and the power saving standby mode voltage control unit are driven by voltage from the main power supply (PSU) when the USB bus power cannot be supplied during the shift to the power saving standby mode, the shift means making the shift to the normal operation state in which the image processing apparatus is driven by the voltage from the main power supply when the starting factor monitor unit detects the return factor from the power saving standby state to the normal operation state during the power saving standby mode.

In this case, when the USB bus power can be supplied during the shift to the power saving standby mode, it is possible that the power saving standby mode voltage control unit is driven by the USB bus power, and a part of the starting factor monitor unit is driven and the voltage to another part of the starting factor monitor unit is interrupted according to the settings.

It is possible that the main power supply on/off control unit is means for turning on or off the commercial alternating current power supply input.

It is possible that the main power supply on/off control unit is means for turning on or off the battery power supply input.

Further the above embodiments are an example of a method of controlling an image processing apparatus, the method comprising a main power supply on/off control step of turning on or off a main power supply; a starting factor monitor step of detecting a return factor from a power saving standby state to a normal operation state during a power saving standby mode; a USB bus power detecting step of detecting USB bus power in the USB I/F which can receive power supply; a power saving standby mode voltage control step of selecting the voltage supplied to a starting factor monitor unit and the voltage supplied to a unit operated during the power saving standby mode; and a shift step of causing a power saving standby mode voltage control unit to control supply voltage to the main power supply on/off control unit and supply voltage to a voltage supply portion in the starting factor monitor unit according to a signal from the USB bus power detecting unit, in accordance with s signal from a USB bus power detecting unit, so that (1) the starting factor monitor unit and the power saving standby mode voltage control unit are driven with the USB bus power when the USB bus power can be supplied during the shift to the power saving standby mode and (2) the starting factor monitor unit and the power saving standby mode voltage control unit are driven by voltage from the main power supply when the USB bus power cannot be supplied, the shift step making the shift to the normal operation state in which the image processing apparatus is driven by the voltage from the main power supply when the starting factor monitor unit detects the return factor from the power saving standby state to the normal operation state during the power saving standby mode.

Incidentally, USB (Universal Serial Bus) is well known as the method of interface-connecting the PC which is of the electronic equipment to the input and output apparatus of the PC. For example, the scanner, the printer, or the multi function printer which is of the input and output apparatus is connected to the PC with USB, the image data is input to the PC, and the data from the PC is printed. The multi function printer also has the facsimile function. The multi function printer can make the facsimile transmission of PC data, and the multi function printer can transmit the data received with the facsimile to the PC to display the data with the PC.

USB can provide the USB bus power supply (5V power supply, and maximum 500 mA) to the peripherals pursuant to the USB standard.

Recently, the electronic equipment is generally provided for the power saving. In the power saving standby mode, particularly it is necessary that the power consumption is reduced as much as possible during the standby state. In this case, the starting factor detecting means are provided in the input and output apparatus, and the electronic equipment shifts from the power saving standby state to the normal standby state or the operation state when the starting factor is detected. Examples of the starting factor include the pressdown of the power saving key in the operation portion, the detection of the manuscript in the scanner unit, the demand for print job, and the reception of a facsimile call signal.

Figure 4:
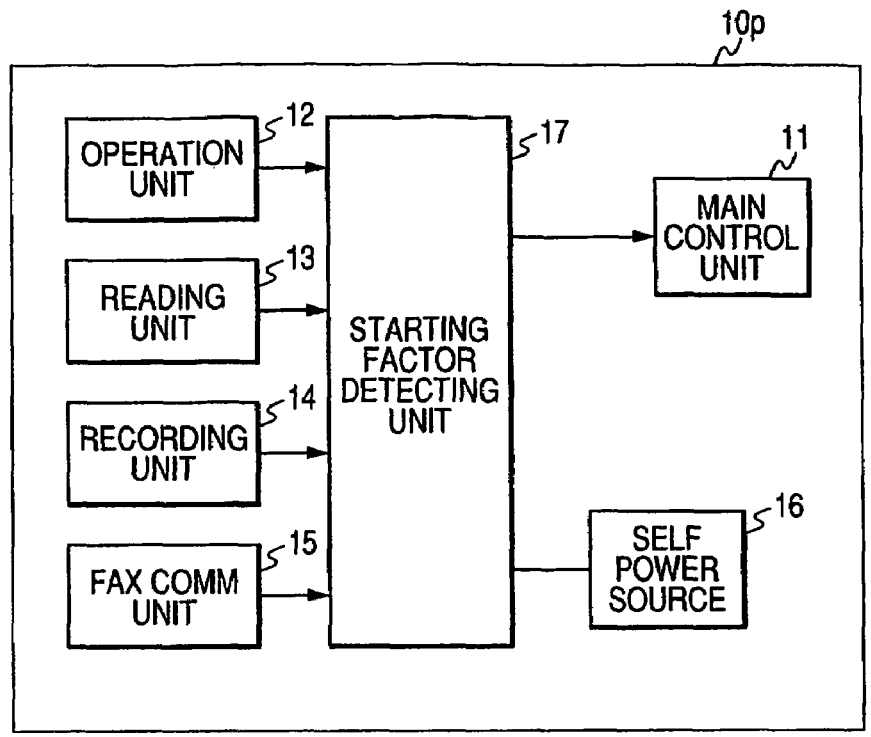
FIG. 4 is a block diagram showing the conventional input and output apparatus 10p.

FIG. 4 is a block diagram showing the conventional input and output apparatus 10$p$.

A main control unit 11 controls the whole of conventional input and output apparatus 10$p$. When the user operates an operation unit 12 to use the apparatus the apparatus is operated according to the user's operation. A readout unit 13 reads the manuscript to convert the data into the electronic signal. A recording unit 14 records characters and pictures in the paper. A FAX communication unit 15 makes the FAX transmission of the signal of the manuscript read by the readout unit 13. The FAX communication unit 15 receives FAX to convert the FAX data into the electronic signal, and the recording unit 14 records the converted electronic signal. The FAX communication unit 15 is connected to the public telephone line and the like, and the FAX communication unit 15 detects and replies an incoming call of the line and controls the transmission. A self-power supply 16 is the power supply provided from the AC power supply or the battery, and the self-power supply 16 provides power supply to the whole of input and output apparatus 10$p$. A starting factor detecting unit 17 is provided.

When the input and output apparatus 10$p$ is in the power saving standby state, in order to reduce the power consumption of the whole of input and output apparatus, only the starting factor detecting unit 17 is set in a conductive state, the main control unit 11 is set in a sleep mode, and other units are turned off as many as possible. Therefore, the low power consumption is realized.

When the operation of the operation unit 12, the manuscript in the readout unit 13, recording start of the recording unit 14, the incoming call of the FAX communication unit 15, or the like is detected, the main control unit 11 is notified of the detection, and the main control unit 11 returns to the normal operation mode to control the input and output apparatus 10$p$ in the normal power supply state. The input and output apparatus 10$p$ performs the normal operation.

With reference to a power saving standby technology which utilizes USB, the conventional technology in which the power control means is turned off to receive a print signal using the electric power provided through the interface cable as the power source is well known (for example, see JP-A No. 2003-118204).

With reference to the technology which utilizes the USB bus power supply, the conventional technology in which the input power supplies are switched according to the load of the device is well known (for example, see JP-A No. 2003-280771).

However, in the above conventional examples, the USB bus power supply does not always supply the current of 500 mA. In the conventional technology disclosed in JP-A No. 2003-118204, there is the problem that sometimes the input and output apparatus 10$p$ is not securely operated when the expected sufficient electric power is not taken from the USB bus power supply.

In the conventional technology disclosed in JP-A No. 2003-280771, there is the problem that the determination of the power amount supplied from the USB cable is made only by a predetermined threshold and the determination can be made only one time.

An object of the invention is to be able to perform the power saving standby state by detecting the electric power amount to efficiently operate the starting factor detecting means with the electric power from the USB bus power supply even if the sufficient electric power cannot be taken from the USB bus power supply.

Sixth Embodiment

Figure 5:
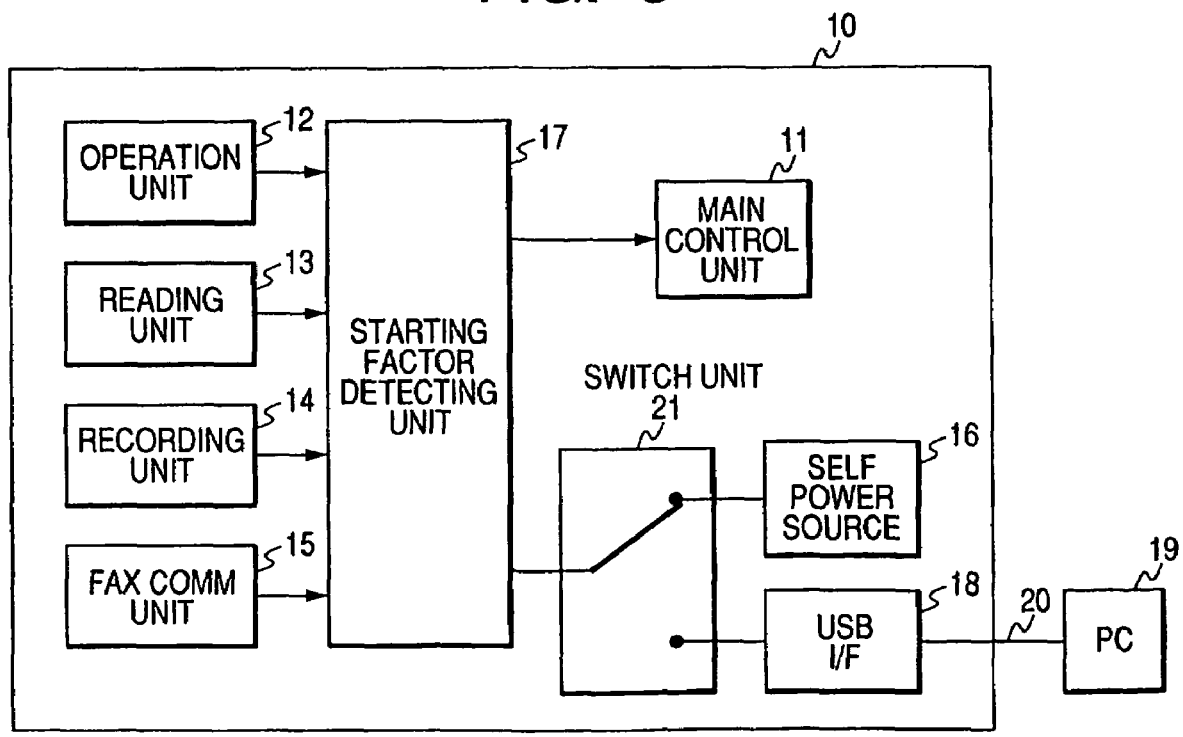
FIG. 5 is a block diagram showing an input and output apparatus 10 of a sixth embodiment of the invention.

FIG. 5 is a block diagram showing an input and output apparatus 10 of a sixth embodiment of the invention.

The input and output apparatus 10 includes the main control unit 11, the operation unit 12, the readout unit 13, the recording unit 14, the FAX communication unit 15, the self-power supply 16, the starting factor detecting unit 17. The units are similar to those described in FIG. 4.

A USB I/F 18 is connected to the PC 19 which is of the electronic equipment through a USB cable 20. The USB I/F 18 is formed pursuant to the USB standard by the USB connector and the circuit which performs USB operation. The USB I/F 18 exchanges the signal (USB communication) with the PC 19. The electric power of 5V and maximum 500 mA is supplied as the VBUS signal to the USB I/F 18 through the USB cable 20.

In the USB standard, when the host and the device are connected to each other, the initialization is performed. At this point, the host means the PC 19, the device means the input and output apparatus 10, the and PC 19 and the input and output apparatus 10 are connected through the USB cable 20.

In the USB initialization, the host requests the device to transmit the descriptor which is of information on the device, and the device returns the descriptor to the host. The descriptor includes the configuration descriptor, and MaxPower is one of the fields in the configuration descriptor. The MaxPower level indicates a half value of the current of the USB bus power supply necessary for the device. When the host determines that the current of MaxPower cannot be supplied, the host rejects the connection of the device.

Then, the flow of the control in the sixth embodiment will be described.

Figure 6:
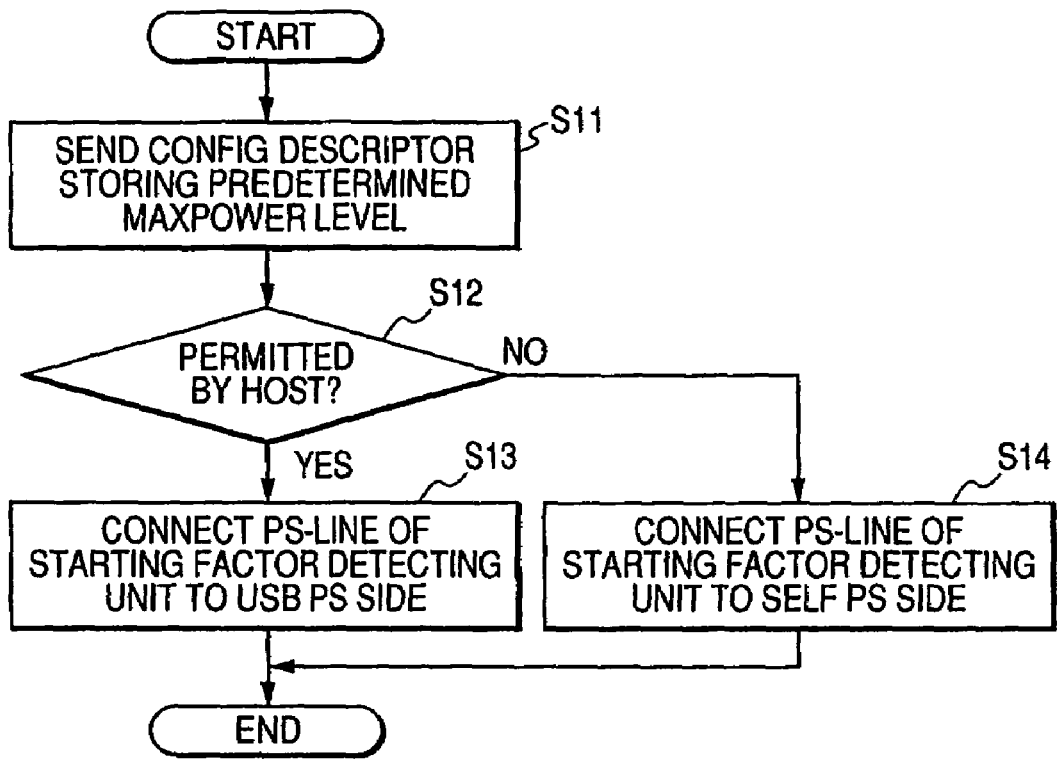
FIG. 6 is a flowchart showing a flow of control in the sixth embodiment of the invention, and FIG. 6 also shows a part of a USB setting action.

FIG. 6 is a flowchart showing the flow of the control in the sixth embodiment of the invention, and FIG. 6 also shows a part of USB setting action.

The USB setting action is operated by the program stored in, e.g. the ROM in the main control unit 11 of the input and output apparatus 10, and the main control unit 11 controls the USB setting action. It is possible that the USB setting action is performed before the USB setting action enters the power saving standby state, and it is possible that the USB setting action performs in the states except for the power saving standby state if necessary.

In S11, during the power saving standby state, the starting factor detecting unit 17 stores a necessary consumption current value as the MaxPower level in the configuration descriptor, and the starting factor detecting unit 17 sends the configuration descriptor to the PC 19 (host).

When the permission is issued from the host through the USB I/F 18 in S12, a switch unit 21 is controlled to connect a power supply line of the starting factor detecting unit 17 to a VBUS line of the USB I/F 18 in S13.

When the host provides the rejection through the USB I/F 18 (S12), the switch unit 21 is controlled to connect the power supply line of the starting factor detecting unit 17 to the power supply line of the self-power supply 16 in S14.

Thus, the control action of the sixth embodiment is ended.

According to the sixth embodiment, during which the input and output apparatus 10 is in the power saving standby state, the power supply of the starting factor detecting unit can be taken from the power supply of the USB power supply in the host when the power supply can be supplied by the exchange between the electronic equipment such as the PC (host) and the configuration descriptor, and the power supply of the starting factor detecting unit can be taken from the self-power supply when the power supply cannot be supplied (when the power supply of the starting factor detecting unit cannot be taken from the USB power supply of the host).

Therefore, the power saving standby state can efficiently be realized.

Seventh Embodiment

In a seventh embodiment, the main control unit 11, the operation unit 12, the readout unit 13, the recording unit 14, the FAX communication unit 15, the self-power supply 16, the USB I/F 18, the PC 19, and the USB cable 20 are similar to those described in FIG. 5.

The seventh embodiment is one in which a starting factor detecting unit 41 and a switch unit 42 are provided instead of the starting factor detecting unit 17 and the switch unit 21 in the input and output apparatus 10.

Figure 7:
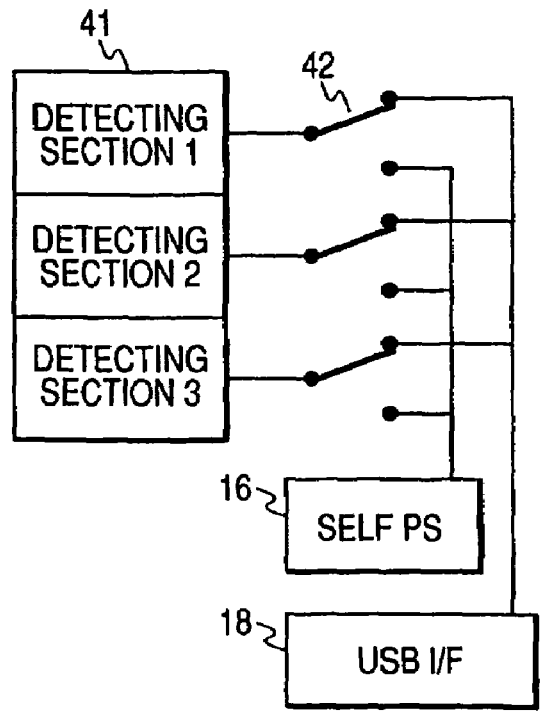
FIG. 7 is a block diagram showing a self-power supply 16, a USB I/F 18, a starting factor detecting unit 41, and a switch unit 42 in the input and output apparatus 10 of a seventh embodiment.

FIG. 7 is a block diagram showing the self-power supply 16, the USB I/F 18, the starting factor detecting unit 41, and the switch unit 42 in the input and output apparatus 10 of the seventh embodiment.

The starting factor detecting unit 41 is divided into the plural circuit blocks, and each block detects the different starting factor. For example, the starting factor detecting unit 41 is divided into three circuit blocks, a detecting section 1 detects the starting factor of the operation unit 12, a detecting section 2 detects the starting factor of the readout unit 13, and a detecting section 3 detects the starting factor of the recording unit 14.

The detecting sections 1, 2, and 3 have the power supply line respectively, and detecting sections 1, 2, and 3 are connected to the switch unit 42.

The switch unit 42 has three switches, and the three switches are connected to the detecting sections 1, 2, and 3 respectively. The power supply lines of the detecting sections 1, 2, and 3 are connected to the self-power supply 16 or the USB I/F 18.

Then, the flow of the control in the seventh embodiment will be described.

Figure 8:
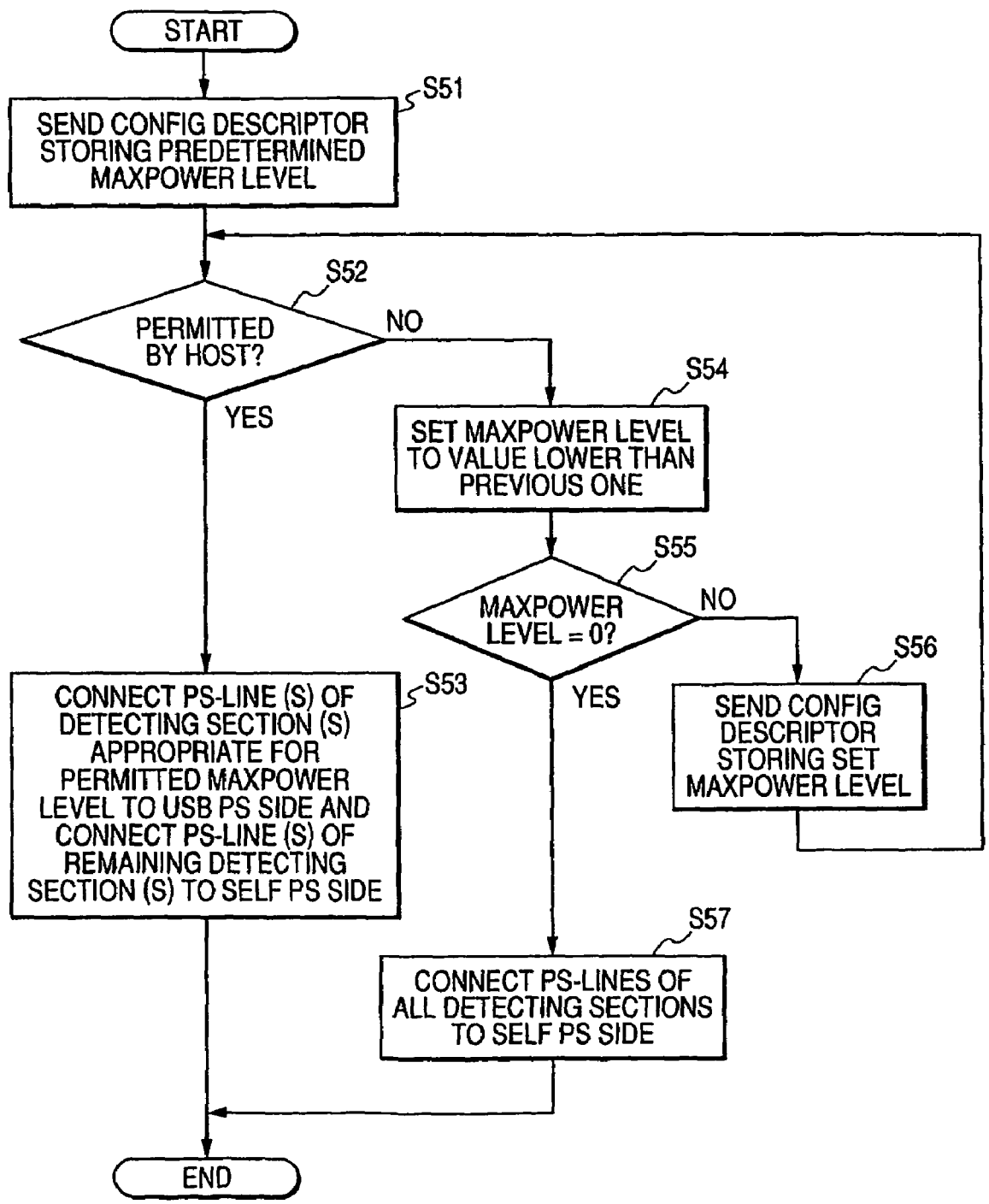
FIG. 8 is a flowchart showing a control action of the seventh embodiment of the invention, and FIG. 8 also is a flowchart showing a part of the USB setting action.

FIG. 8 is a flowchart showing the control action of the seventh embodiment of the invention, and FIG. 7 also is the flowchart showing a part of the USB setting action.

The program corresponding to the flowchart shown in FIG. 8 is stored in, e.g. the ROM in the main control unit 11 of the input and output apparatus 10, and the main control unit 11 controls the program.

It is possible that the USB setting action is performed before the USB setting action enters the power saving standby state, and it is possible that the USB setting action performs in the states except for the power saving standby state if necessary.

In S51, the sum of the consumption current values necessary for the operations of the detecting sections 1, 2, and 3 in the starting factor detecting unit 41 shown in FIG. 7 is stored as the MaxPower level in the configuration descriptor, and the starting factor detecting unit 41 sends the configuration descriptor to the PC 19 (host).

When the permission is issued from the host through the USB I/F 18 in S52, the starting factor detecting unit power supply appropriate for the permitted MaxPower level can be connected to the USB power supply, and the all the detecting sections of the starting factor detecting unit are connected to the USB power supply. That is, the switch unit 42 is controlled to connect the power supply lines of all the detecting sections to the VBUS line of the USB I/F 18, and the control is ended.

On the other hand, when the host provides the rejection through the USB I/F 18 in S52, the MaxPower level smaller than the MaxPower level transmitted in S51 is set in S54. That is, the "smaller MaxPower level" is the sum of the consumption current values necessary for the operations of the detecting sections 1 and 2 except for the detecting section 3 in the starting factor detecting unit 41.

Because the smaller MaxPower level set in S54 is not zero in S55, the set smaller MaxPower level is stored in the configuration descriptor, and the configuration descriptor is sent to the PC 19 (host).

When the smaller MaxPower level is permitted by the host through the USB I/F 18 in S52, the switch unit 42 is controlled to connect the power supply lines of the detecting sections 1 and 2 to the VBUS line of the USB I/F 18 and to connect the power supply line of the detecting section 3 to the self-power supply 16 in S53, and the control is ended.

On the other hand, when the smaller MaxPower level is rejected by the host through the USB I/F 18 in S52, the MaxPower level further smaller than the smaller MaxPower level previously transmitted is set in S54. That is, the "further smaller MaxPower level" is the consumption current value necessary for the operation of the detecting section 1 in the starting factor detecting unit 41 except for the detecting sections 2 and 3.

Because the "further smaller MaxPower level" set in S54 is not zero in S55, the set "further smaller MaxPower level" is stored in the configuration descriptor, and the configuration descriptor is sent to the PC 19 (host).

When the "further smaller MaxPower level" is permitted by the host through the USB I/F 18 in S52, the switch unit 42 is controlled to connect the power supply line of the detecting section 1 to the VBUS line of the USB I/F 18 and to connect the power supply lines of the detecting sections 2 and 3 to the self-power supply 16 in S53, and the control is ended.

On the other hand, when the "further smaller MaxPower level" is rejected by the host through the USB I/F 18 in S52, although the MaxPower level smaller than the "further smaller MaxPower level" previously transmitted is set in S54, the setting does not exist in the starting factor detecting unit 41. Therefore, the MaxPower level becomes zero in S55, so that the switch unit 42 is controlled to connect the power supply lines of all the detecting sections in the starting factor detecting unit 41 to the self-power supply 16, and the control is ended.

According to the seventh embodiment, during the power saving standby state, the input and output apparatus 10 exchanges the MaxPower level in the configuration descriptor with the electronic equipment such as the PC (host) while the MaxPower level is set to the optimum level so that the PC can supply the electric power. Therefore, the power supply of the starting factor detecting unit can be taken from the USB power supply of the host as much as possible. When the host cannot supply the electric power (when the power supply of the starting factor detecting unit cannot be taken from the USB power supply of the host), the power supply of the starting factor detecting unit can be taken from the self-power supply, so that the power saving standby state can efficiently be realized.

According to the invention, in the whole system including the PC and the MFP, usually power supply efficiency becomes worsened because the small amount of power is consumed in the MFP during the power saving standby mode. Therefore, the power supply in which one of the power supplies whose power supply efficiency becomes worse is turned off, which results in the effects that the power consumption can be reduced during the power saving standby mode and the life of the MFP power supply can be lengthened.

Further, according to the invention, the voltage to a circuit having a function which is not used during the power saving standby mode is interrupted, so that the power consumption can further be reduced.

This application claims priority from Japanese Patent Application No. 2004-092572 filed on Mar. 26, 2004, which is hereby incorporated by reference herein.

The invention claimed is:

1. An image processing apparatus comprising:
a main power supply on/off control unit which turns on or off a main power supply;
a starting factor monitor unit which detects a return factor from a power saving standby state to a normal operation state during a power saving standby mode;
a USB bus power detecting unit which detects USB bus power in a USB I/F which can receive power supply;
a power saving standby mode voltage control unit which selects the starting factor monitor unit or a unit operated during the power saving standby mode as a voltage supplying object; and
shift means for causing the power saving standby mode voltage control unit to control supply voltage to the main power supply on/off control unit and supply voltage to a voltage supply portion in the starting factor monitor unit according to a signal from the USB bus power detecting unit, in accordance with a signal from the USB bus power detecting unit, so that (1) the starting factor monitor unit and the power saving standby mode voltage control unit are driven with the USB bus power when the USB bus power can be supplied during a shift to the power saving standby mode and (2) the starting factor monitor unit and the power saving standby mode voltage control unit are driven by voltage from the main power supply when the USB bus power cannot be supplied during the shift to the power saving standby mode, the shift means making the shift to the normal operation state in which the image processing apparatus is driven by the voltage from the main power supply when the starting factor monitor unit detects the return factor from the power saving standby state to the normal operation state during the power saving standby mode.

2. An image processing apparatus according to claim 1, wherein, when the USB bus power can be supplied at or during the shift to the power saving standby mode, the power saving standby mode voltage control unit is driven by the USB bus power, and a part of the starting factor monitor unit is driven and another part thereof is not provided with the supply of voltage, according to setting.

3. An image processing apparatus according to claim 1 or 2, wherein the main power supply on/off control unit is means for turning on or off commercial alternating current power supply input.

4. An image processing apparatus according to claim 1 or 2, wherein the main power supply on/off control unit is means for turning on or off battery power supply input.

5. A method of controlling an image processing apparatus, comprising:
a main power supply on/off control step of turning on or off a main power supply;
a starting factor monitor step of detecting a return factor from a power saving standby state to a normal operation state during a power saving standby mode;
a USB bus power detecting step of detecting USB bus power in a USB I/F which can receive power supply;
a power saving standby mode voltage control step of selecting the voltage supplied to a starting factor monitor unit and the voltage supplied to a unit operated during the power saving standby mode; and
a shift step of causing a power saving standby mode voltage control unit to control supply voltage to the main power supply on/off control unit and supply voltage to a voltage supply portion in the starting factor monitor unit according to a signal from the USB bus power detecting unit, in accordance with a signal from a USB bus power detecting unit, so that (1) the starting factor monitor unit and the power saving standby mode voltage control unit are driven with the USB bus power when the USB bus power can be supplied during the shift to the power saving standby mode and (2) the starting factor monitor unit and the power saving standby mode voltage control unit are driven by voltage from the main power supply when the USB bus power cannot be supplied, the shift step making the shift to the normal operation state in which the image processing apparatus is driven by the voltage from the main power supply when the starting factor monitor unit detects the return factor from the power saving standby state to the normal operation state during the power saving standby mode.

6. A program stored on a computer-readable storage medium, the program causing a computer to execute:
   a main power supply on/off control procedure of turning on or off a main power supply;
   a starting factor monitor procedure of detecting a return factor from a power saving standby state to a normal operation state during a power saving standby mode;
   a USB bus power detecting procedure of detecting USB bus power in a USB I/F which can receive power supply;
   a power saving standby mode voltage control procedure of selecting a starting factor monitor unit or a unit operated during the power saving standby mode as a voltage supplying object; and
   a shift procedure of causing a power saving standby mode voltage control unit to control supply voltage to a main power supply on/off control unit and supply voltage to a voltage supply portion in the starting factor monitor unit according to a signal from the USB bus power detecting unit so that (1) the starting factor monitor unit and the power saving standby mode voltage control unit are driven with the USB bus power when the USB bus power can be supplied during the shift to the power saving standby mode, and (2) the starting factor monitor unit and the power saving standby mode voltage control unit are driven by voltage from the main power supply when the USB bus power cannot be supplied, the shift procedure making the shift to the normal operation state in which the image processing apparatus is driven by the voltage from the main power supply when the starting factor monitor unit detects the return factor from the power saving standby state to the normal operation state during the power saving standby mode.

7. A computer readable storage medium in which a program is stored, the program which causes a computer to execute:
   a main power supply on/off control procedure of turning on or off a main power supply;
   a starting factor monitor procedure of detecting a return factor from a power saving standby state to a normal operation state during a power saving standby mode;
   a USB bus power detecting procedure of detecting USB bus power in a USB I/F which can receive power supply;
   a power saving standby mode voltage control procedure of selecting a starting factor monitor unit or a unit operated during the power saving standby mode as a voltage supplying object; and
   a shift procedure of causing a power saving standby mode voltage control unit to control supply voltage to a main power supply on/off control unit and supply voltage to a voltage supply portion in the starting factor monitor unit according to a signal from the USB bus power detecting unit so that (1) the starting factor monitor unit and the power saving standby mode voltage control unit are driven with the USB bus power when the USB bus power can be supplied during the shift to the power saving standby mode, and (2) the starting factor monitor unit and the power saving standby mode voltage control unit are driven by voltage from the main power supply when the USB bus power cannot be supplied, the shift procedure making the shift to the normal operation state in which the image processing apparatus is driven by the voltage from the main power supply when the starting factor monitor unit detects the return factor from the power saving standby state to the normal operation state during the power saving standby mode.

8. An input and output apparatus which is connected to an electronic apparatus through an interface cable to input information from or output information to the electronic apparatus, the input and output apparatus, comprising:
   starting factor detecting means for detecting a factor which shifts from a power saving standby state to an operation state;
   switch means for connecting a power supply of the starting factor detecting means to one of an external power source through the interface cable and a self-power source;
   means for transmitting a setting value, into which power consumption of the starting factor detecting means is converted, to the electronic apparatus through the interface cable; and
   switch control means for controlling the switch means so that all the power supplies of the starting factor detecting means are connected to the external power source, when the electronic apparatus permits the setting value.

9. An input and output apparatus according to claim 8, wherein the switch control means has second switch control means for controlling the switch means so that all the power supplies of the starting factor detecting means are connected onto the self-power supply side, when the electronic apparatus rejects the setting value.

10. An input and output apparatus according to claim 8 or 9, further comprising means for transmitting a setting value smaller than the previous setting value to the electronic apparatus when the electronic apparatus rejects the previous setting value,
    wherein the switch control means has third switch control means for, when the electronic apparatus permits the transmitted setting value,
    controlling the switch means so that some of power supplies of the starting factor detecting means corresponding to the permitted value are connected to the external power supply through the interface cable and the remaining power supplies of the starting factor detecting means are connected to the self-power supply.

11. An input and output apparatus according to claim 10, further comprising means for repeatedly transmitting the setting value smaller than the previous setting value to the electronic apparatus until the electronic apparatus permits the setting value.

12. An input and output apparatus according to claim 8, wherein the interface is USB, the interface power supply is a USB bus power supply, and the setting value is a MaxPower level of a USB configuration descriptor.

13. An input and output apparatus according to claim 8, wherein said apparatus has a plurality of functions of inputting information from and outputting information to the electronic apparatus,
    wherein the starting factor detecting means is a plurality of means for detecting the factor which shifts from the power saving standby state to the operation state to respond to the plurality of functions, and
    the power supply of each starting factor detecting means is the power supply having a plurality of switch means for connecting to one of the external power supply through the interface cable and the self-power supply.

* * * * *